Patented July 31, 1945

2,380,554

UNITED STATES PATENT OFFICE 2,380,554

POLYMERIZATION IN AQUEOUS EMULSION

Frank K. Schoenfeld, Silver Lake, Ohio, assignor to The B. F. Goodrich Company, New York, N. Y., a corporation of New York No Drawing. Application November 21, 1941, Serial No. 419,943

3 Claims. (Cl. 260—84.5)

This invention relates to the polymerization of unsaturated organic compounds in aqueous emulsion and particularly to a method of treating the inside surfaces of ferrometallic vessels whereby such vessels may advantageously be employed as chambers for conducting such polymerizations.

It is known that the vessel in which polymerizations in aqueous emulsion are conducted may profoundly affect the course of the polymerization and the type of polymer obtained. When it is attempted to carry out polymerizations in vessels made of a ferrometallic material such as iron or steel, the polymerization reaction is strongly inhibited by these materials and in many cases the polymerization fails to take place. Other materials from which polymerizers might be constructed are not altogether suitable because a deposit of polymer forms on the walls of the vessels thereby reducing the heat conductivity of the vessel and the yield of the desired type of product. These and other difficulties accompanying polymerizations in aqueous emulsion have made the selection of materials of construction for polymerizers very difficult. Despite its fragility, poor heat conductivity and expensiveness as compared to certain metals, glass has been the material ordinarily selected for this purpose.

I have now discovered that vessels constructed of a ferrometallic material such as iron, steel or a ferrous alloy may be rendered suitable for use as vessels for conducting polymerizations in aqueous emulsion by treating the inside surfaces of such vessels with an oxidizing agent capable of reacting with metallic iron at the surface to produce an insoluble coating of a higher oxide of iron. Ferrometallic vessels whose surfaces in contact with the emulsion during the polymerization have been treated to change them from metallic iron to higher oxides of iron no longer exert an inhibiting effect on polymerizations and do not promote the formation of polymer. Accordingly, this invention comprises polymerizing an unsaturated organic compound in aqueous emulsion in a ferrometallic vessel in which the surfaces in contact with the emulsion during the polymerization have been treated to convert them from metallic iron to higher oxides of iron, by which is meant oxides in which at least a part of the iron is present in the ferric state such as ferric oxide, $Fe_2O_3$, or magnetic oxide, $Fe_3O_4$.

The treatment of the inside surface of the polymerizer to convert the metallic iron at the surface into higher oxides of iron may be carried out by any one of a number of known methods. Thus the metallic surface may be treated with concentrated nitric acid, or with some other oxidizing acid such as chromic acid, perchloric acid or the like or with solutions of salts of oxidizing acids such as the alkali chromates, dichromates, or perchlorates. Other oxidizing agents capable of converting ferric iron into higher oxides of iron such as hydrogen peroxide, or solutions containing peroxides, or even steam may also be employed. The exact nature of the treatment will depend upon the particular agent used but in general the treatment should be carried out at elevated temperatures and for a time sufficiently long to insure the formation of a fairly thick film of the oxide on the metallic surface. Treatments with concentrated nitric acid at 100° C. for 1 to 4 hours have been found to be quite satisfactory. Treatments with superheated steam at 100–700° C. are also effective as are treatments with peroxide solutions for 48 hours and treatments with 5% dichromate solutions at 100° C. for 2 to 10 hours.

The ferrometallic material may be treated to convert its surface to a higher oxide of iron either before the construction of a polymerization vessel or the vessel itself may have its inside surface treated by filling the vessel with the oxidizing agent, spraying the oxidizing agent onto the inside surface or in any other convenient manner. It is, of course, desirable to clean the metallic surface thoroughly before treatment to remove rust or other foreign material and to rinse and dry the treated surface before use as a polymerization chamber.

In one experiment designed to determine the effect of a ferrometallic material having a surface coating of a higher oxide of iron on emulsion polymerization, a black cast iron strip was immersed in concentrated nitric acid for one hour at 100° C., and was then removed, rinsed thoroughly with water and with a hot soap solution and dried. The treated iron strip was placed in a glass vessel together with an aqueous emulsion prepared by emulsifying a mixture of butadiene and acrylonitrile in a soap solution and the aqueous emulsion was then polymerized. The polymerization proceeded in a normal manner and was complete after 36½ hours at 30° C. Successive polymerizations were then carried out in presence of the same treated iron strip all of which proceeded in a normal manner. After four polymerizations of butadiene and acrylonitrile, and two polymerizations of butadiene and methyl methacrylate, the iron strip was still in excellent condition and the surface was entirely free of adherent polymer. In fact there were several spots of polymer on the glass vessel but none on the treated iron strip. The latices formed by the polymerizations were coagulated to form high quality synthetic rubbers which, when vulcanized, had tensile strengths of 4000–5000 lb./sq. in.

When this experiment was repeated employing a similar black iron strip which had not been subjected to the nitric acid treatment, the polymerization was completely inhibited there being no polymer formed even after five days at 30° C. Although the iron strip did not rust nor corrode appreciably, the polymerization having been conducted in an alkaline emulsion, it was impossible to carry out the polymerization in the presence of this metallic strip.

Other experiments in which similar iron strips were treated with 3% hydrogen peroxide for 48 hrs. at room temperature, 5% potassium dichromate for 1 hour at 100° C., and steam at 100° C. for 48 hours produced results substantially equivalent to those obtained with the nitric acid treatment. Thus it is seen that no harmful effect on the polymerization is brought about by ferrometallic materials which have had their metallic surface converted into an iron oxide surface. Moreover such surfaces are admirably suited for use in emulsion polymerizations since they do not favor the formation of a deposit of polymer. The economic advantages resulting from this invention are considerable since relatively cheap materials such as ordinary iron or steel may be converted by an economical process into materials which may be used to replace glass as a material for the construction of polymerizers.

Ferrometallic vessels whose inside surfaces have been treated so as to convert them from metallic iron to insoluble higher oxides of iron may be used as chambers for conducting any emulsion polymerization regardless of the compound polymerized and of the other components which may be present in the emulsion. Thus, many unsaturated organic compounds among which are vinyl halides such as vinyl chloride, vinyl esters such as vinyl acetate, acrylic esters and nitriles such as methyl methacrylate and acrylonitrile, olefins such as isobutylene, styrene and vinyl naphthalene, conjugated dienes such as butadiene, isoprene, 2,3-dimethyl butadiene and chloroprene and mixtures of two or more unsaturated organic compounds such as mixtures of vinyl chloride and vinyl acetate, butadiene and acrylonitrile, butadiene and methyl methacrylate, butadiene and styrene, etc., may be polymerized in aqueous emulsion in such vessels. The aqueous emulsion is prepared, preferably, by emulsifying the unsaturated organic compound or compounds with a solution of an emulsifying agent which produces an alkaline emulsion, suitable emulsifying agents being, for example, such fatty acid soaps as sodium oleate, sodium palmitate, sodium myristate or the like. Emulsions prepared with other emulsifying agents, however, may also be employed.

Other materials such as polymerization initiators, catalysts, activators, modifiers or the like which have elsewhere been described as being useful in emulsion polymerizations may also be present in the emulsion polymerized in the vessels described herein. Polymerization initiators which are oxidizing agents such as hydrogen peroxide, benzoyl peroxide, potassium persulfate and the like are especially useful when conducting polymerization in these vessels since the presence of the oxidizing agent helps to maintain the oxide film.

It is to be understood that many other variations and modifications in the nature of the emulsion polymerized and in the method of converting the inside ferrometallic surface of the polymerizer to a surface of insoluble higher iron oxides, will occur to those skilled in the art and may be effected without departing from the spirit and scope of the appended claims.

I claim:

1. The method which comprises preparing an aqueous emulsion comprising butadiene-1,3, bringing the emulsion so prepared into contact with a surface consisting of a water-insoluble higher oxide of iron and polymerizing the butadiene-1,3 in the emulsion while the emulsion is in contact with the surface, whereby the polymerization proceeds at a rate which is unretarded by the surface and the surface remains substantially free of adherent polymer throughout the polymerization.

2. The method which comprises preparing an aqueous emulsion comprising butadiene-1,3 and acrylonitrile emulsified in an aqueous soap solution, bringing the emulsion so prepared into contact with a surface consisting of a water-insoluble higher oxide of iron and copolymerizing the butadiene-1,3 and the acrylonitrile in the emulsion while the emulsion is in contact with the surface, whereby the copolymerization proceeds at a rate which is unretarded by the surface and the surface remains substantially free of adherent polymer throughout the polymerization.

3. The method which comprises preparing an aqueous emulsion comprising butadiene-1,3 and styrene emulsified in an aqueous soap solution, bringing the emulsion so prepared into contact with a surface consisting of a water-insoluble higher oxide of iron and copolymerizing the butadiene-1,3 and the styrene in the emulsion while the emulsion is in contact with the surface, whereby the copolymerization proceeds at a rate which is unretarded by the surface and the surface remains substantially free of adherent polymer throughout the polymerization.

FRANK K. SCHOENFELD.